United States Patent
Choi

(10) Patent No.: US 11,766,978 B2
(45) Date of Patent: Sep. 26, 2023

(54) CRASH PAD DEVICE WITH REAL WOOD SHEET

(71) Applicant: HYUNDAI MOBIS Co., Ltd., Seoul (KR)

(72) Inventor: Ik Keun Choi, Yongin-si (KR)

(73) Assignee: HYUNDAI MOBIS Co., Ltd., Seoul (KR)

( * ) Notice: Subject to any disclaimer, the term of this patent is extended or adjusted under 35 U.S.C. 154(b) by 0 days.

(21) Appl. No.: 17/842,190

(22) Filed: Jun. 16, 2022

(65) Prior Publication Data
US 2023/0041224 A1    Feb. 9, 2023

(30) Foreign Application Priority Data
Aug. 4, 2021  (KR) .......... 10-2021-0102385

(51) Int. Cl.
*B60R 21/045*    (2006.01)
*B60K 37/02*    (2006.01)

(52) U.S. Cl.
CPC .......... *B60R 21/045* (2013.01); *B60K 37/02* (2013.01); *B60K 2370/15* (2019.05); *B60K 2370/166* (2019.05); *B60K 2370/168* (2019.05); *B60K 2370/654* (2019.05)

(58) Field of Classification Search
CPC .......... B60R 21/045; B60K 37/02; B60K 2370/654; B60K 2370/15; B60K 2370/166; B60K 2370/168

USPC .......... 362/489
See application file for complete search history.

(56) References Cited

U.S. PATENT DOCUMENTS

2018/0336329 A1* 11/2018 Walford .......... B60Q 3/00
2020/0331327 A1* 10/2020 Nishio .......... B60J 3/02

FOREIGN PATENT DOCUMENTS

KR  10-2020-0042116 A   4/2020
WO  WO-2019135358 A1 *  7/2019 .......... B60J 3/02

OTHER PUBLICATIONS

English Translation of WO 2019/13558 A1 (Year: 2019).*

* cited by examiner

*Primary Examiner* — Andrew J Coughlin
*Assistant Examiner* — Hana S Featherly
(74) *Attorney, Agent, or Firm* — NSIP Law

(57) ABSTRACT

The present disclosure relates to a crash pad device for a vehicle with a real wood sheet, the crash pad device including a real wood sheet comprising a real wood design portion having a real wood pattern processed thereon, and an edge portion formed at an edge of the design portion, and a lighting portion disposed at a lower side of the real wood sheet and being configured to emit light to an outside through the real wood pattern.

11 Claims, 7 Drawing Sheets

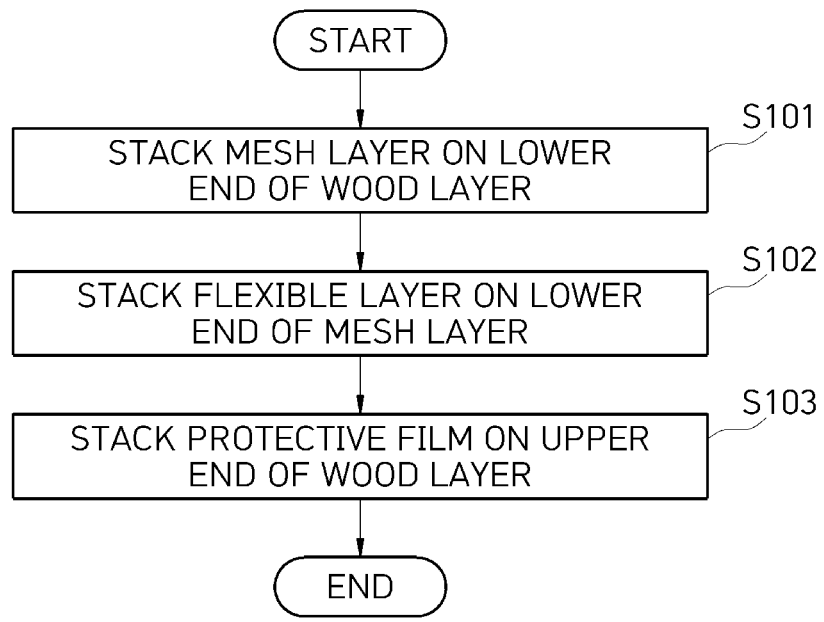
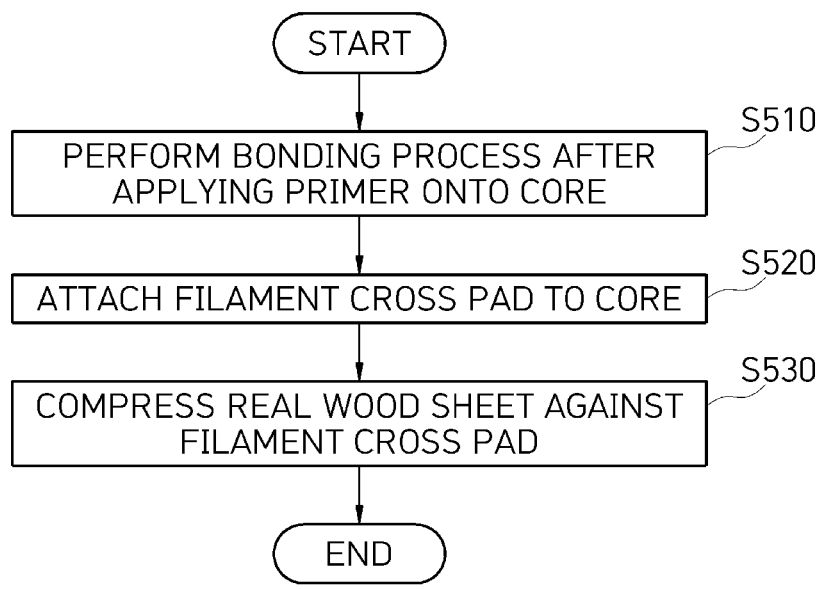

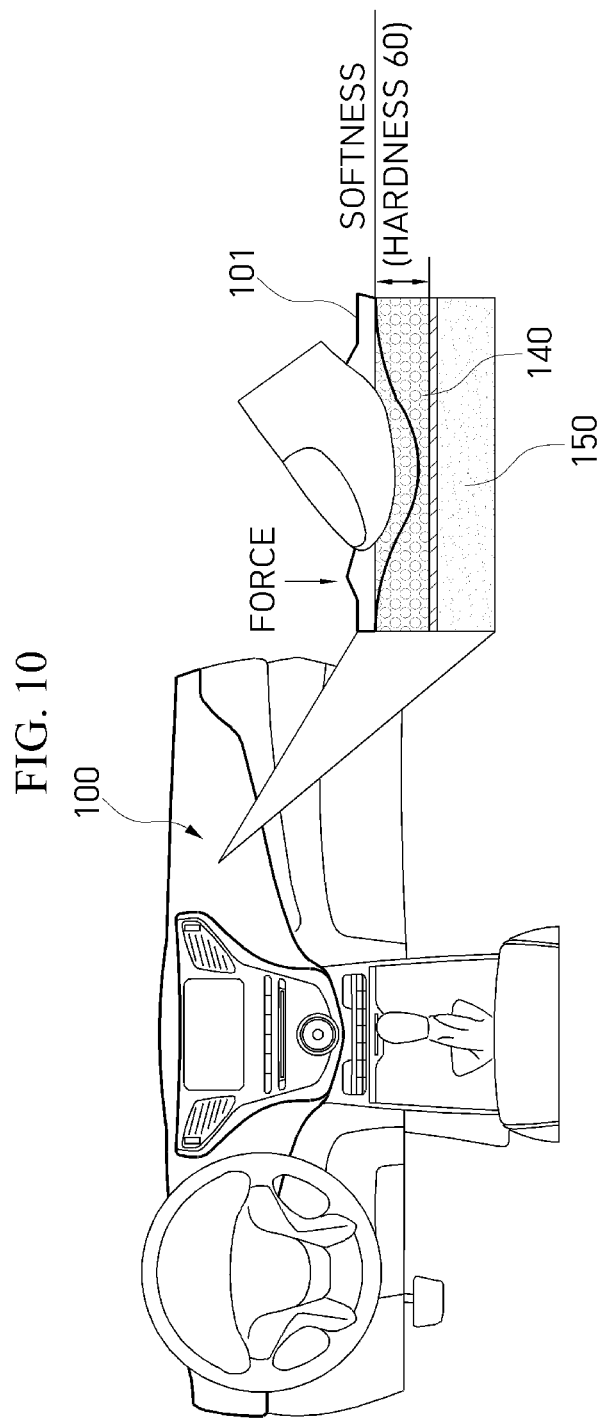

CRASH PAD DEVICE WITH REAL WOOD SHEET

CROSS-REFERENCE TO RELATED APPLICATIONS

This application claims the benefit under 35 USC § 119(a) of Korean Patent Application No. 10-2021-0102385, filed on Aug. 4, 2021 in the Korean Intellectual Property Office, the entire disclosure of which is incorporated herein by reference for all purposes.

BACKGROUND

1. Field

The present disclosure relates to real wood skin used for automatic wrapping, and a process and apparatus for manufacturing the same.

2. Description of Related Art

Real wood skin applied to a vehicle in the related art is made by preforming a real wood sheet on deco-veneer wood and then performing insert-injection molding (back injection).

Thereafter, trimming is performed on an end of the injection-molded real wood sheet, and then curling and coating are sequentially performed on the real wood sheet, thereby manufacturing the real wood skin.

The real wood skin product in the related art, which is made by applying the back insert-injection molding process, may provide real wood having a visually and tactilely excellent surface. However, because the real wood having high hardness is attached to the injection-molded part, the real wood provides cheeping feeling to a customer when the customer pushes the real wood.

Of course, some customers may think that it is natural for the real wood product to have high hardness. However, a customer, who needs soft interior materials, cannot be satisfied with the real wood.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a crash pad device with a real wood sheet, the crash pad device including a real wood sheet comprising a real wood design portion having a real wood pattern processed thereon, and an edge portion formed at an edge of the design portion, and a lighting portion disposed at a lower side of the real wood sheet and being configured to emit light to an outside through the real wood pattern.

The real wood pattern may be formed by laser patterning during any one of real wood shape forming and wrapping processes.

The real wood pattern may be a debossed pattern having a thickness of 10 to 20 mm.

The real wood design portion and the edge portion each may include a wood layer configured to provide a visual appearance of wood, a mesh layer stacked on a lower portion of the wood layer and being configured to provide reinforcement, and a flexible layer stacked on a lower portion of the mesh layer and being configured to provide flexibility.

The lighting portion may be configured to change colors of mood lighting depending on traveling speeds of a vehicle in conjunction with a speed sensor of the vehicle, in response to the vehicle travelling at a high speed.

The lighting portion may operate in conjunction with a navigation system, and the lighting portion may be configured to change colors or emission time of mood lighting to visually inform a driver that the speed of a vehicle exceeds a regulation speed by emitting mood lighting with a color or providing flickering light, in response to a speed of the vehicle exceeding the regulation speed.

The lighting portion may be configured to operate in conjunction with a navigation system, to move a light-emitting point along a real wood pattern to a destination point on a route, and to visually inform that a vehicle arrives at an inflection point on the route.

Other features and aspects will be apparent from the following detailed description, the drawings, and the claims.

BRIEF DESCRIPTION OF THE DRAWINGS

FIG. 8 is a flowchart for explaining a method of manufacturing a real wood sheet according to the embodiment of the present disclosure.

FIG. 9 is a flowchart for explaining a method of manufacturing a real wood crash pad according to the embodiment of the present disclosure.

FIG. 10 is a reference view for explaining an example in which a crash pad for a vehicle including the real wood sheet according to the embodiment of the present disclosure is installed.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure. Unless particularly stated otherwise in the present specification, a singular form also includes a plural form. The terms "comprise (include)" and/or "comprising (including)" used in the specification are intended to specify the presence of the mentioned constituent elements, steps, operations, and/or elements, but do not exclude the presence or addition of one or more other constituent elements, steps, operations, and/or elements.

Figure 1:
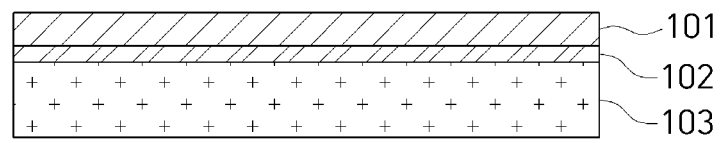
FIG. 1 is a reference view for explaining real wood skin according to the present disclosure which may be used for automatic wrapping.

FIG. 1 is a reference view for explaining real wood skin according to the present disclosure which may be used for automatic wrapping.

As illustrated in FIG. 1, real wood skin according to a first embodiment of the present disclosure, which may be used for automatic wrapping, includes a wood layer 101, a mesh layer 102, and a flexible layer 103.

The wood layer 101 is a layer that provides the same visual feeling as a wooden material. The wood layer 101 may have a thickness of 0.1 t to 0.2 t and may have a grain of wood made by a shading machine.

Further, the mesh layer 102 is a layer stacked on a lower portion of the wood layer 101 and configured to reinforce a sheet. The mesh layer 102 may have a thickness of 0.2 t.

In addition, the flexible layer 103 is a layer stacked on a lower portion of the mesh layer 102 and configured to provide flexibility. The flexible layer 103 may be made of one of polypropylene (PP) foam and thermoplastic polyolefin (TPO) foam. Further, the flexible layer 103 may have a thickness of 1 t to 2 t.

In addition, according to the first embodiment of the present disclosure, the real wood skin may further include a protective film 104 stacked on an upper portion of the wood layer 101 and configured to protect the wood layer. The protective film 104 may have a thickness of 0.1 t.

Figure 2:
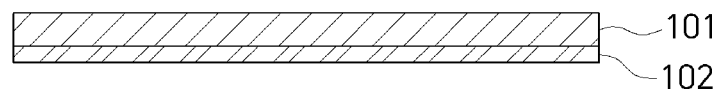
FIGS. 2, 3, 4, 5 and 6 are reference views for explaining a process of manufacturing a crash pad for a vehicle including a real wood sheet according to an embodiment of the present disclosure.
Figure 3:
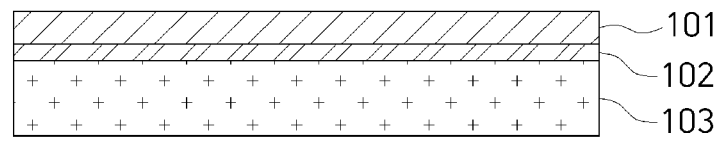
Figure 4:
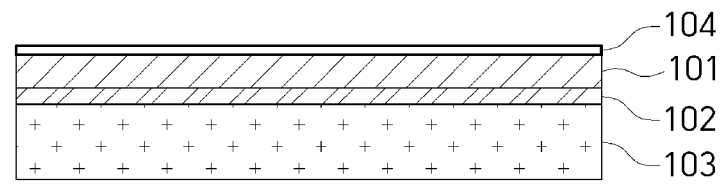

FIGS. 2 to 4 are reference views for explaining a process of manufacturing a real wood sheet according to the first embodiment of the present disclosure.

As illustrated in FIG. 2, in the real wood sheet according to the first embodiment of the present disclosure, the mesh layer 102 is stacked on a lower end of the wood layer 101. Thereafter, as illustrated in FIG. 3, the flexible layer 103 is stacked on a lower end of the mesh layer 102. Further, as illustrated in FIG. 4, the protective film 104 may be stacked on an upper end of the wood layer 101 and protect the wood layer 101.

Figure 5:
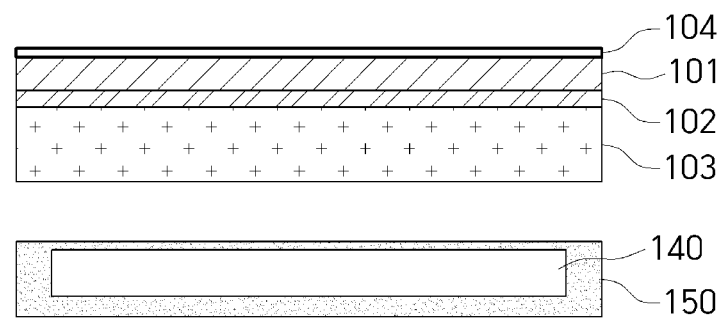
Figure 6:
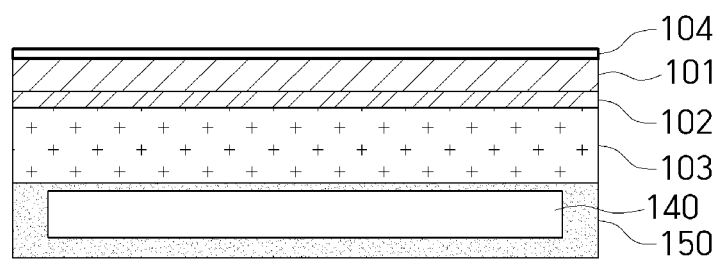

As illustrated in FIGS. 5 and 6, a real wood sheet 100 including the wood layer 101, the mesh layer 102, and the flexible layer 103 further includes a filament cross pad 140 and a core 150 disposed at a lower side thereof.

The filament cross pad 140 is provided in a partial region of a desk in order to provide cushioning to the partial region of the region of the desk of the vehicle.

Figure 7:
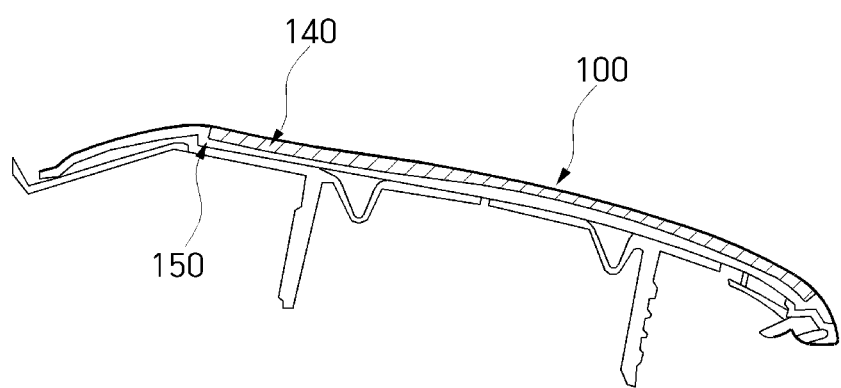
FIG. 7 is a reference view for explaining an example in which a filament cross pad is applied to the embodiment of the present disclosure.

As described above, the filament cross pad 140 provided in one region of the desk is stacked on a lower portion of the flexible layer 103. In this case, the filament cross pad 140 may have a thickness of 2 t to 5 t. In this case, as illustrated in FIG. 7, a region to which the filament cross pad 140 is applied is an entire region that the hand may reach, i.e., a region within 3 mm or less from an end of an injection-molded portion of the real wood sheet. The filament cross pad 140 may be a pad made of a material such as PP or TPO. However, the material of the filament cross pad 140 is not limited thereto.

Further, the core 150 may be mounted on the desk of the vehicle and have a thickness of 0.3 t.

FIG. 8 is a flowchart for explaining a method of manufacturing a real wood sheet according to the embodiment of the present disclosure.

As illustrated in FIG. 8, according to the method of manufacturing a real wood sheet according to the first embodiment of the present disclosure, the mesh layer 102 is stacked on the lower end of the wood layer 101, as illustrated in FIG. 2 (S101).

Thereafter, as illustrated in FIG. 3, the flexible layer 103 is stacked on the lower end of the corresponding mesh layer 102 (S102).

Further, as illustrated in FIG. 4, the protective film 104 may be stacked on the upper end of the wood layer 101 (S103), thereby protecting the wood layer 101.

FIG. 9 is a flowchart for explaining the method of manufacturing a real wood crash pad according to the embodiment of the present disclosure.

As illustrated in FIG. 9, a bonding process of applying primer onto the core 150 and then applying a bonding agent onto the core 150 is performed (S510). Thereafter, the filament cross pad 140 is attached to the core 150 (S520). The filament cross pad may be attached by a membrane or press compression process.

That is, after the bonding process of applying the bonding agent onto an upper portion of the filament cross pad 140 is performed, a compression jig is used to compress the real wood sheet 100 including the wood layer 101, the mesh layer 102, and the flexible layer 103 against the filament cross pad 140 (S530).

As described above, the real wood sheet 100 constituting the desk of the vehicle may provide the same visual feeling as real wood and provide a predetermined degree of cushioning when an occupant touches the real wood sheet 100, as illustrated in FIG. 10.

According to the first embodiment of the present disclosure, the PP foam/TPO foam may be applied onto a wood rear surface to increase an elongation percentage of the real wood sheet and improve quality of a surface of the real wood sheet, and the filament cross pad, which is used for natural leather or artificial leather in the related art, may be applied to the core, thereby providing a real-wood-wrapped product with softness that cannot be implemented when the real wood sheet in the related art is manufactured by injection-molding.

Figure 11:
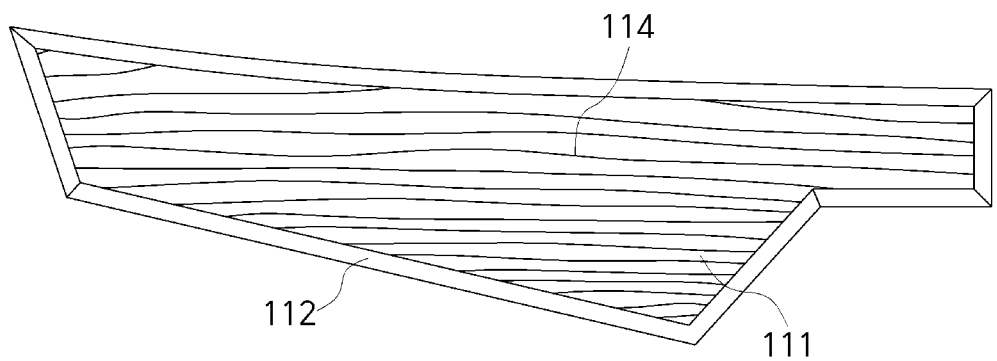
FIG. 11 is a view for explaining a crash pad including a real wood sheet according to a third embodiment of the present disclosure.

FIG. 11 is a view for explaining a real wood sheet according to a second embodiment of the present disclosure.

As illustrated in FIG. 11, the real wood sheet according to the second embodiment of the present disclosure includes a real wood design portion 111 and an edge portion 112.

The real wood design portion 111 is a region having a real wood pattern 114 for diversifying design for each real wood. The real wood pattern 114 may be formed by laser patterning during real wood shape forming and wrapping processes. The real wood pattern 114 may have a debossed pattern having a thickness of 10 to 20 mm.

Further, the edge portion 112 is provided at an outer periphery of the real wood design portion 111.

As described above, since the real wood sheet includes the real wood design portion 111 and the edge portion 112, it is possible to prevent damage to the real wood sheet due to the wrapping process and provide a more real wood sheet even though the wrapping process of wrapping the real wood sheet around the core is performed.

A second embodiment of the present disclosure may provide real wood sheets having various types of design by forming a pattern on real wood, and particularly, provide a real wood sheet capable of providing a real wood material while providing an effect such as mood lighting implemented by light emitted in the real wood sheet while the product is used.

The second embodiment of the present disclosure includes a real wood design portion 111, an edge portion 112, and a lighting portion 113.

Because the real wood design portion 111 and the edge portion 112 according to the second embodiment are identical in configuration to those in the above-mentioned embodiment, a description thereof will be omitted.

Figure 12:
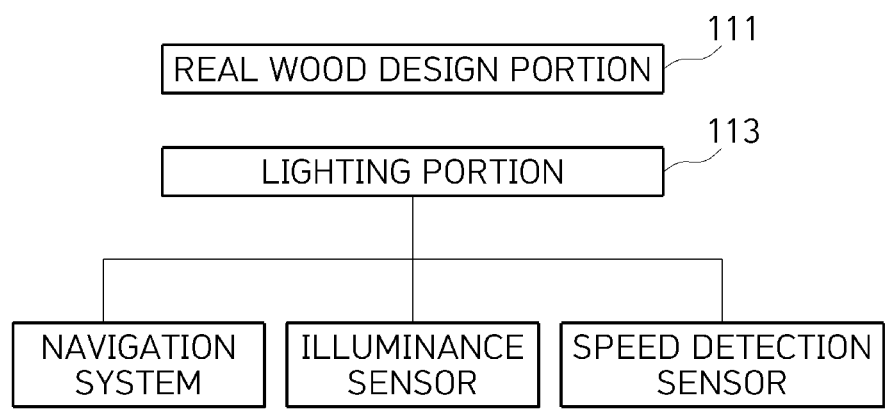
FIG. 12 is a configuration block diagram for explaining a crash pad device including a real wood sheet according to another embodiment of the present disclosure.

As illustrated in FIG. 12, the lighting portion 113 is formed on a lower portion of the real wood sheet 100 on which the real wood pattern is formed. The lighting portion 113 emits predetermined light to the real wood sheet so that the light may be transmitted through the real wood pattern.

According to a third embodiment of the present disclosure, it is possible to provide mood lighting while a vehicle travels at night and provide lighting suitable for a dangerous situation or a traveling environment in conjunction with devices for providing information on the dangerous situation or the traveling environment.

For example, when the vehicle travels at high speed, the lighting portion 113 may change colors of the mood lighting depending on traveling speeds in conjunction with a speed sensor of the vehicle.

Alternatively, the lighting portion 113 operates in conjunction with a navigation system. When the speed of the vehicle exceeds a regulation speed, the lighting portion 113 may change colors or emission time of the mood lighting in order to visually inform a driver that the speed of the vehicle exceeds the regulation speed by emitting mood lighting with a color (red) or providing flickering light.

Figure 13:
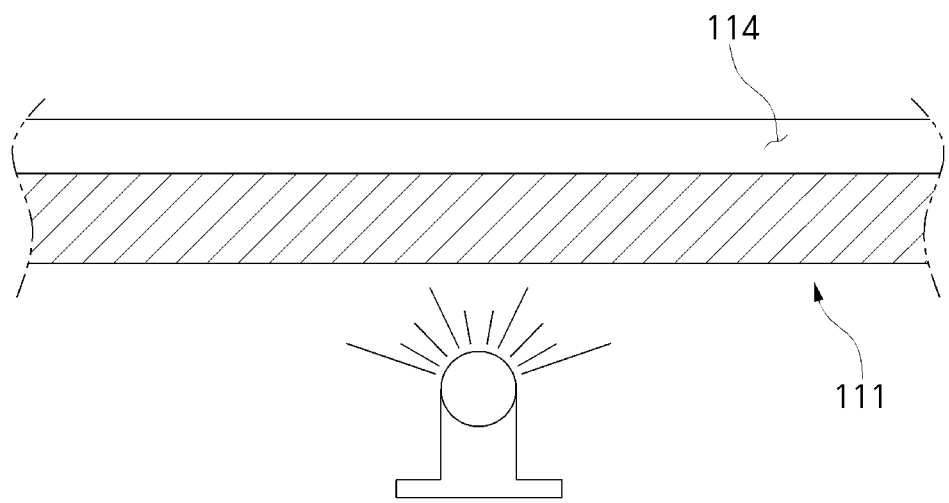
FIG. 13 is a reference view for explaining an operation of the crash pad device including the real wood sheet according to the embodiment of the present disclosure.

Further, in the case in which the lighting portion operates in conjunction with the navigation system, the lighting portion moves a light-emitting point along any real wood pattern to a destination point on a route, as illustrated in FIG. 13, thereby visually informing the driver that the vehicle arrives at an inflection point on the route.

A third embodiment of the present disclosure may provide real wood sheets having various types of design by forming a pattern on real wood, and particularly, provide a real wood material while providing the effect such as mood lighting implemented by light emitted in the real wood sheet when the real wood crash pad is applied.

In addition, the third embodiment of the present disclosure may provide linear lighting along the real wood pattern 113 formed on the real wood design portion 111.

Figure 14:
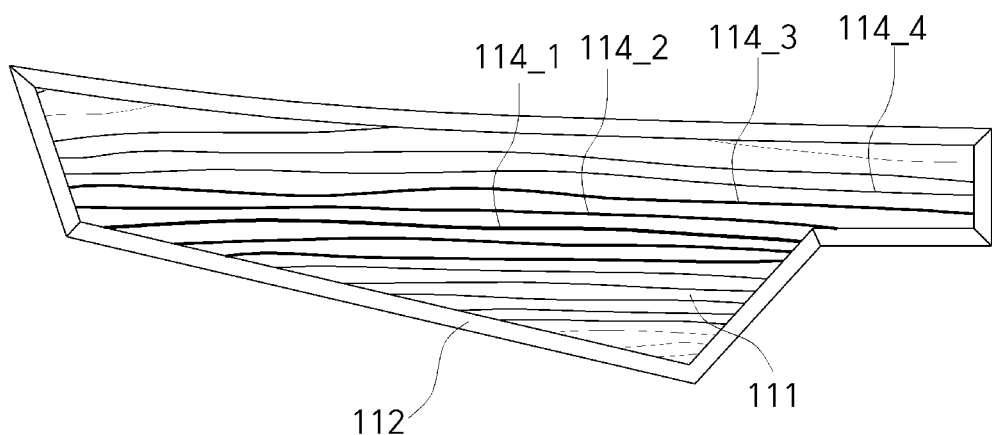
FIG. 14 is a reference view for explaining another real wood sheet applied to the crash pad device for a vehicle including the real wood sheet according to the embodiment of the present disclosure.

Meanwhile, according to another embodiment of the present disclosure, as illustrated in FIG. 14, the real wood pattern of the real wood design portion 111 may have different thicknesses depending on positions on the real wood pattern. For example, a debossed pattern 114-1 at a central portion of the real wood pattern has a thickness of 20 mm. Thicknesses of debossed patterns 114-2, 114-3, and 114-4 may be respectively 17 mm, 14 mm, and 11 mm from the central portion to an outer periphery of the real wood pattern.

In addition, in the third embodiment of the present disclosure, the lighting portion operates in conjunction with the navigation system. When the navigation system provides a distance to a change point while guiding the route, the lighting portion may more clearly provide the driver with the corresponding information through the debossed pattern 114 at the central portion.

Figure 15:
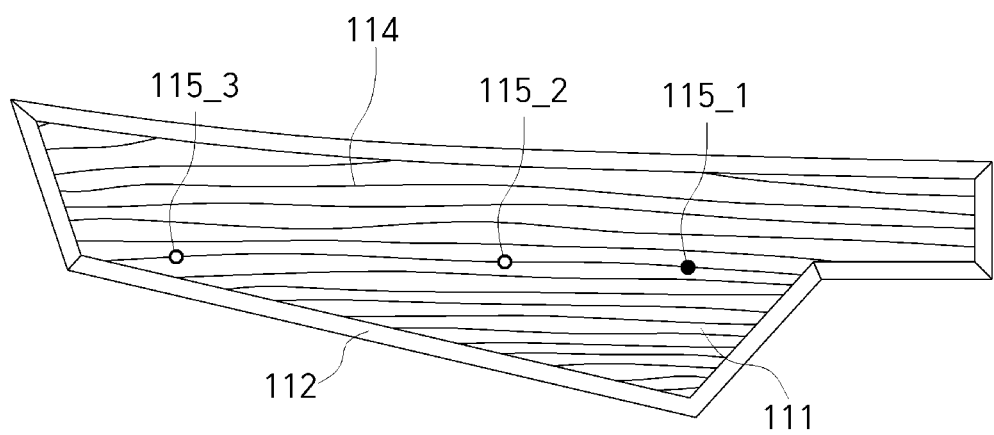
FIG. 15 is a reference view for explaining another example of the crash pad device for a vehicle including the real wood sheet according to the embodiment of the present disclosure.

As illustrated in FIG. 15, a guide beam 115-1 emitted from the lighting portion 113, which operates in conjunction with the navigation system, to the debossed pattern 114 of the real wood design portion 111 moves like a guide beam 115-2 or 115-3 along the route provided by the navigation system.

Therefore, according to an embodiment of the present disclosure, it is possible for the driver to not only determine whether to change the route through a screen of the navigation system, but also more easily check a route change point by using the real wood sheet provided in the vehicle.

According to an embodiment of the present disclosure a real wood sheet capable of visually providing a real wood feeling and flexibility and being used for automatic wrapping is provided.

According to an embodiment of the present disclosure a real wood sheet capable of being used for automatic wrapping for wrapping a real wood pad during a process of manufacturing the real wood sheet is provided.

According to an embodiment of the present disclosure, the real wood sheet constituting a desk of a vehicle may visually provide the same feeling as real wood.

According to an embodiment of the present disclosure real wood sheets having various types of design by forming a pattern on real wood are provided, and particularly, provided are a real wood sheet capable of providing a real wood material while providing an effect such as mood lighting implemented by light emitted in the real wood sheet while the product is used.

According to an embodiment of the present disclosure, provided are real wood sheets having various types of design by forming a pattern on real wood, and particularly, provided are a real wood material while providing the effect such as mood lighting implemented by light emitted in the real wood sheet when the real wood crash pad is applied.

Each step included in the method described above may be implemented as a software module, a hardware module, or a combination thereof, which is executed by a computing device.

Also, an element for performing each step may be respectively implemented as first to two operational logics of a processor.

The software module may be provided in RAM, flash memory, ROM, erasable programmable read only memory (EPROM), electrical erasable programmable read only memory (EEPROM), a register, a hard disk, an attachable/detachable disk, or a storage medium (i.e., a memory and/or a storage) such as CD-ROM.

An exemplary storage medium may be coupled to the processor, and the processor may read out information from the storage medium and may write information in the storage medium. In other embodiments, the storage medium may be provided as one body with the processor.

The processor and the storage medium may be provided in application specific integrated circuit (ASIC). The ASIC may be provided in a user terminal. In other embodiments, the processor and the storage medium may be provided as individual components in a user terminal.

Exemplary methods according to embodiments may be expressed as a series of operation for clarity of description, but such a step does not limit a sequence in which operations are performed. Depending on the case, steps may be performed simultaneously or in different sequences.

In order to implement a method according to embodiments, a disclosed step may additionally include another step, include steps other than some steps, or include another additional step other than some steps.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A crash pad device with a real wood sheet, the crash pad device comprising:
   a real wood sheet comprising a real wood design portion having a real wood pattern processed thereon; and
   a lighting portion disposed at a lower side of the real wood sheet and being configured to emit light to an outside through the real wood pattern,
   wherein the real wood sheet comprises
      a first layer configured to provide a visual appearance of wood,
      a mesh layer stacked on a lower portion of the first layer and being configured to provided reinforcement, and
      a flexible layer stacked on a lower portion of the mesh layer and being configured to provided flexibility.

2. The crash pad device of claim 1, wherein the real wood pattern is formed by laser patterning during any one of real wood shape forming and wrapping processes.

3. The crash pad device of claim 1, wherein the real wood pattern is a debossed pattern having a thickness of 10 to 20 mm.

4. The crash pad device of claim 3, wherein the thickness of the real wood pattern is 17 mm near a central portion, 11 mm near a peripheral portion, and 14 mm at a portion between the central portion and the peripheral portion.

5. The crash pad device of claim 3, wherein the real wood sheet comprises wood.

6. The crash pad device of claim 1, wherein the lighting portion is further configured to change colors of mood lighting depending on traveling speeds of a vehicle in conjunction with a speed sensor of the vehicle, in response to the vehicle travelling at a high speed.

7. The crash pad device of claim 1, wherein the lighting portion operates in conjunction with a navigation system, and
   the lighting portion is further configured to change colors or emission time of mood lighting to visually inform a driver that the speed of a vehicle exceeds a regulation speed by emitting mood lighting with a color or providing flickering light, in response to a speed of the vehicle exceeding the regulation speed.

8. The crash pad device of claim 1, wherein the lighting portion is further configured to operate in conjunction with a navigation system, to move a light-emitting point along a real wood pattern to a destination point on a route, and to visually inform that a vehicle arrives at an inflection point on the route.

9. The crash pad device of claim 1, further comprising an edge portion formed at an edge of the design portion.

10. The crash pad device of claim 1, further comprising a protective film disposed on an upper side of the real wood sheet.

11. The crash pad device of claim 1, further comprising:
 a filament cross pad disposed on a lower portion of the flexible layer, and being configured to provide cushioning; and
 a core enclosed within an upper layer and lower layer of the filament cross pad.

* * * * *